United States Patent Office 3,030,419
Patented Apr. 17, 1962

3,030,419
PREPARATION OF SOLID ORGANOBORON COMPOUNDS
Nicholas A. Poulos, Niagara Falls, N.Y., assignor, by mesne assignments, to Mathieson Chemical Corporation, a corporation of Virginia
No Drawing. Filed Feb. 21, 1957, Ser. No. 641,766
2 Claims. (Cl. 260—606.5)

This invention relates to fuels and, more particularly, to solid fuels in which an organoboron compound is an essential constituent.

The fuels of this invention, when incorporated with suitable oxidizers such as ammonium perchlorate, potassium perchlorate, ammonium nitrate, etc., yield solid propellants suitable for rocket power plants and other jet propelled devices. Such propellants burn with high flame speeds, have high heats of combustion and are of the high specific impulse type. Probably the most important single factor in determining the preformance of a propellant change is the specific impulse; appreciable increases in performances will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application will be found to burn uniformly without disintegration and to be mechanically strong enough to withstand ordinary handling.

According to this invention, the solid organoboron compounds are obtained by a two stage process which includes reacting an olefin hydrocarbon having from 2 to 5 carbon atoms and diborane in a carrier stream of an inert gas at a temperature of about 150° to 200° C. in a first reaction stage and then reacting the first reaction effluent with additional diborane in the presence of nickel at a temperature of about 175° to 275° C. in a second reaction stage. The pressure in each reaction stage can vary from 0 to 15 p.s.i.g. The molar ratio of olefin hydrocarbon with respect to diborane in the first reaction stage is about 0.25–0.75:1 and that of the inert gas to diborane is about 1–10:1. The additional diborane charged to the second reaction stage is about 1 to 3 times that charged to the first reaction stage. The residence time of the gases in the first reaction stage is about 1 to 15 seconds and in the second reaction stage is about 10 to 20 seconds determined at standard conditions of temperature and pressure, i.e. 760 mm. Hg and 0° C. Suitable olefin hydrocarbons are, for example, ethylene, propylene, butylene, amylene and mixtures thereof. Suitable inert gases are, for example, hydrogen and nitrogen.

The following experimental example further illustrates this invention and is to be considered not limitive.

*Example I*

In this experiment the first reaction stage was a sparger reactor and the second reaction stage was a catalytic bed reactor.

The sparger reactor was an elongated tube, about 12 inches long with an inside diameter of about 30 mm. and a volume of about 150 ml., substantially enclosed in a hot oil jacket and having longitudinally situated therein a smaller perforated or disparger tube about 8 mm. in diameter and extending about 10 inches down into the reactor. Separate manifolds for the reactant gases were connected to the elongated tube and to the disparger tube.

In the catalytic bed reactor the catalyst bed was composed of 0.24 inch by 0.24 inch protruded nickel packings. The bed was in the shape of an inverted cone having a diameter of about 12 cm. and a heighth of about 13 cm. The bed was supported by a section of the reactor wall generally in the shape of an inverted cone. This portion of the reactor wall was heated by a hot oil jacket. Above the catalyst bed was a small mixing chamber into which the diborane and the first reactor effluent separately entered. There was an opening in the support at the bottom of the catalyst bed through which reaction products passed to a trap, through a low tempertaure bath, and eventually to the air through Nujol.

A stream of diborane diluted with 1.67 times its volume of hydrogen and a stream of propylene diluted with 3.33 times its volume of hydrogen were separately and continuously introduced into the top of the sparger reactor for a period of 240 minutes.

The diborane at the rate of 240 ml. at S.T.P. per minute and hydrogen at the rate of 400 ml. per minute were introduced into the annular space surrounding the disparger tube through an inlet at the top of the reactor and propylene at the rate of 120 ml. at S.T.P. per minute and hydrogen at the rate of 400 ml. at S.T.P. per minute were introduced into the top of the disparger tube. The temperature of the gas stream in the sparger reactor was maintained at approximately 165–170° C. and the residence time in the sparger reactor for the gases was 7.7 seconds at S.T.P.

The gases from the sparger reactor were passed directly into the catalytic bed reactor together with 420 ml. S.T.P. per minute of additional diborane. The temperature of the gases in the catalytic bed reactor was maintained at about 202°–207° C. and the residence time of the reactants in this reactor was 16.2 seconds at S.T.P.

At the conclusion of the experiment, the solids trapped in the nickel packing in the catalytic bed were shaken loose and collected. They weighed 19.8 grams and analyzed on the average 48.2% boron, 6.9% hydrogen and 3.1% carbon. The solids were not pyrophoric. Upon exposure to air they expanded in volume. Hence it is assumed that the balance of the product analyzed was oxygen since the solids were exposed to air for several hours before analysis.

The boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers such as ammonium perchlorate, potassium perchlorate, sodium perchlorate, ammonium nitrate, etc. In formulating a solid propellant composition using one of the materials produced by the present invention, generally from 10 to 35 parts by weight of boron-containing solids and from 65 to 90 parts by weight of oxidizer, such as ammonium perchlorate, are present in the final propellant composition. In the propellant, the oxidizer and the product of the present process are formulated in admixture with each other, as by finely subdividing each of the materials separately and thereafter combining them. The purpose of doing this is to provide proper burning characteristics in the final propellant. In addition to the oxidizer and the oxidizable materials, the final propellant can also contain an artificial resin, generally of the urea-formaldehyde or phenol-formaldehyde type, the function of the resin being to give the propellant mechanical strength and at the same time improve its burning characteristics. Thus in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant composition, reference is made to U.S. Patent 2,622,277 to Bonnell et al. and U.S. Patent 2,646,596 to Thomas et al.

I claim:

1. A two-stage method for the preparation of solid organoboron compounds which includes reacting in a first reaction stage an olefin hydrocarbon having from 2 to 5 carbon atoms and diborane in a molar ratio of about 0.25–0.75:1 in a carrier stream of an inert diluent gas in an amount by volume based on the diborane of about 1–10:1 at a temperature of from about 150° to 200° C. for from 1 to 15 seconds determined at standard conditions of temperature and pressure, passing the effluent from the first reaction stage to a second reaction stage, reacting the first reaction effluent with additional diborane in a molar proportion based on the diborane charged to the first reaction stage of about 1–3:1 in the second reaction stage in contact with nickel particles at a temperature of about 175° to 225° C. for from about 10 to 20 seconds determined at standard conditions of temperature and pressure, and separating the solid reaction products from the reaction mixture.

2. The method of claim 1 in which the inert gas is hydrogen and the olefin hydrocarbon is propylene.

No references cited.

UNITED STATES PATENT OFFICE
CERTIFICATE OF CORRECTION

Patent No. 3,030,419                  April 17, 1962

Nicholas A. Poulos

It is hereby certified that error appears in the above numbered patent requiring correction and that the said Letters Patent should read as corrected below.

In the grant, lines 2 and 3 and 12, and in the heading to the printed specification, lines 5 and 6, name of assignee, for "Mathieson Chemical Corporation", each occurrence, read -- Olin Mathieson Chemical Corporation --; column 1, line 20, for "preformance" read -- performance --; line 21, for "change" read -- charge --; column 2, line 8, for "tempertaure" read -- temperature --.

Signed and sealed this 11th day of September 1962.

(SEAL)
Attest:

ERNEST W. SWIDER
Attesting Officer

DAVID L. LADD
Commissioner of Patents